Patented Jan. 8, 1929.

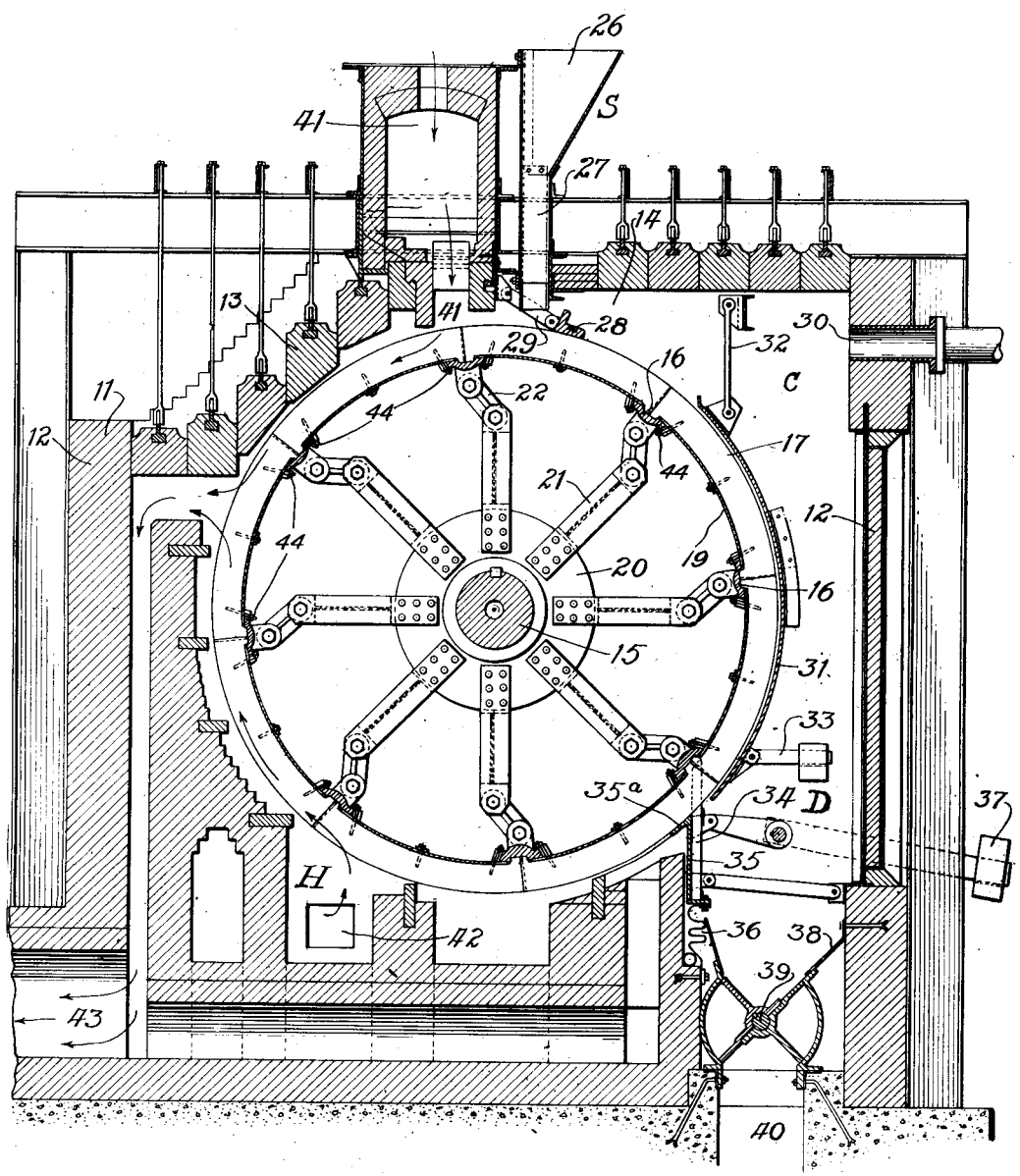

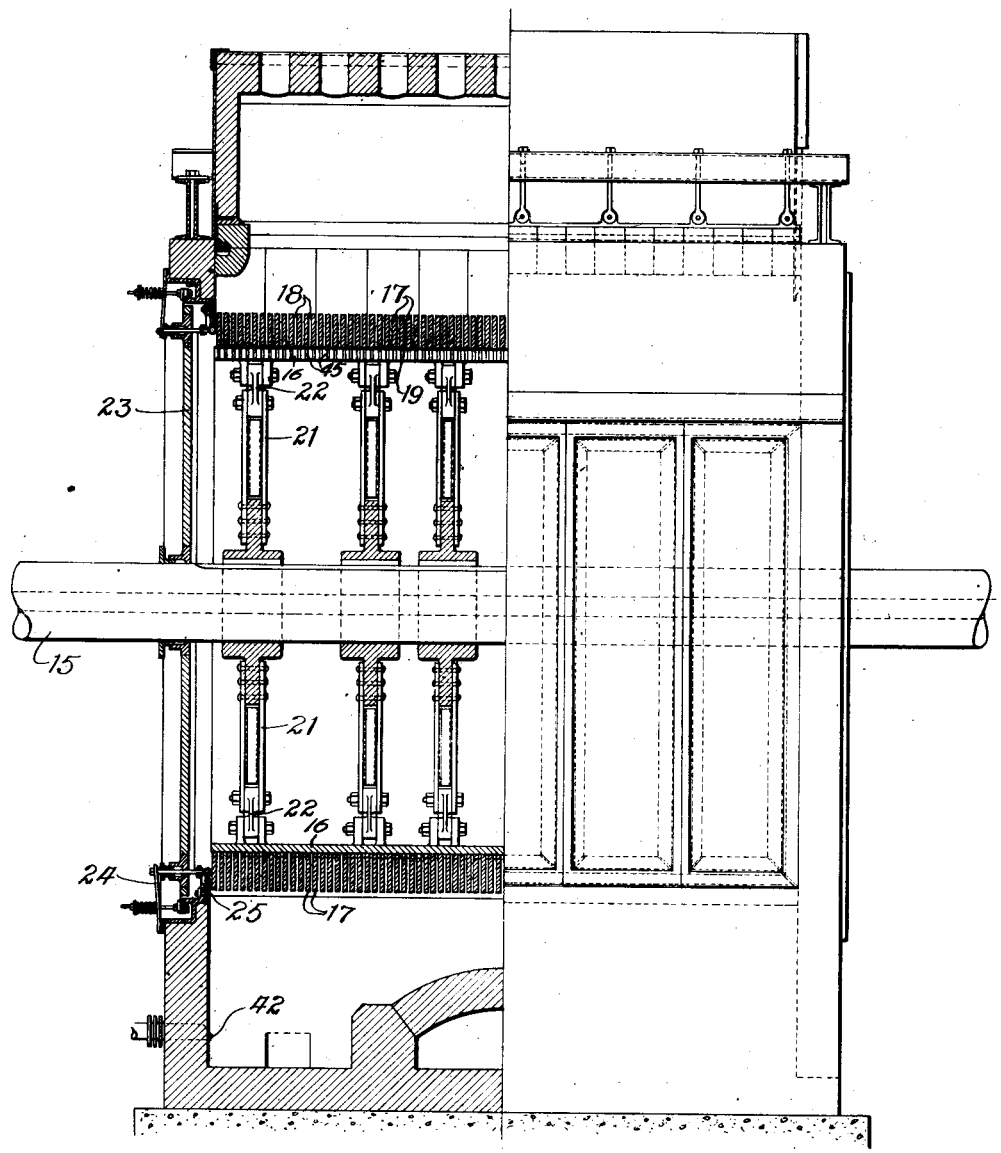

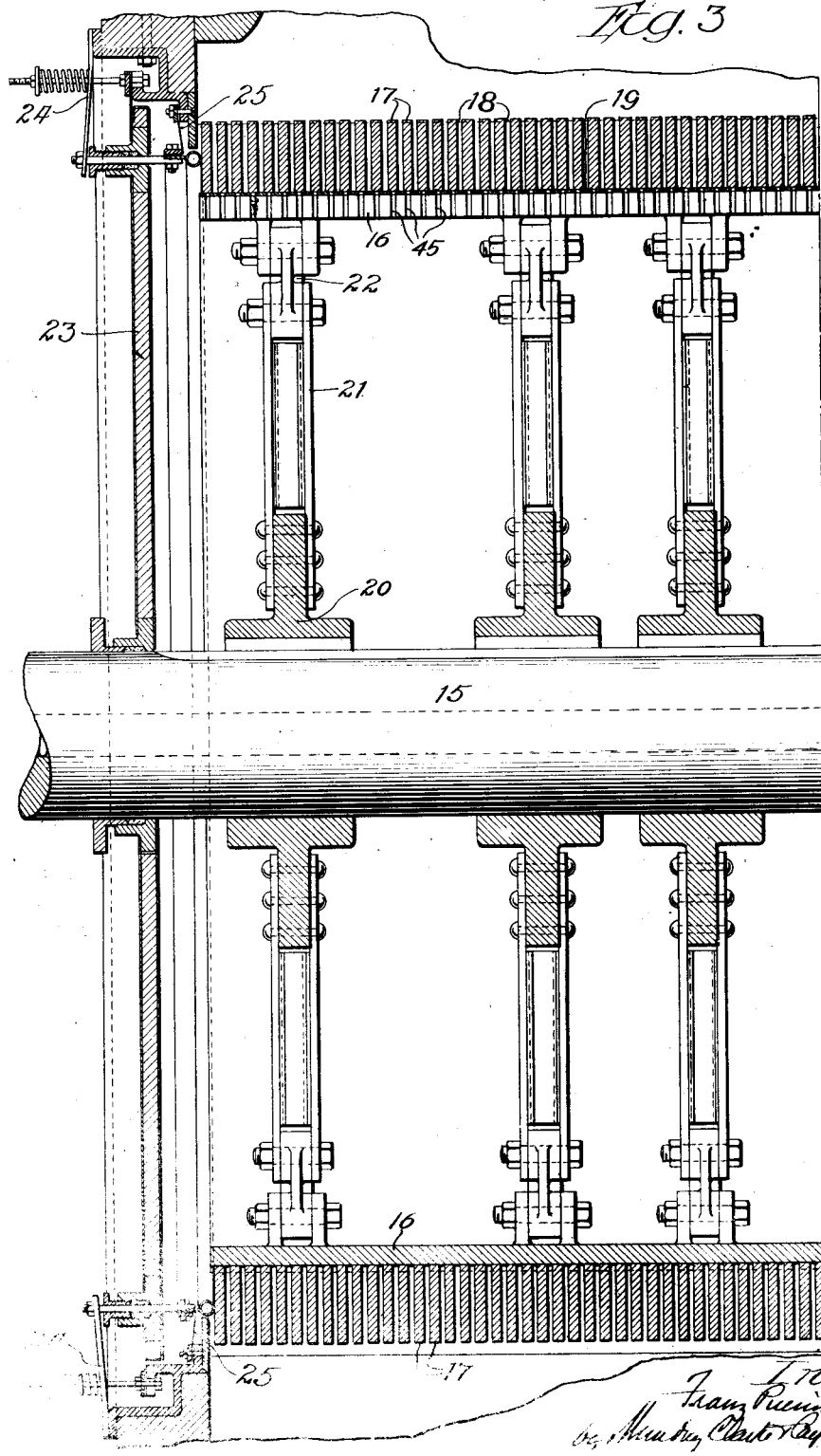

1,698,349

UNITED STATES PATENT OFFICE.

FRANZ PUENING, OF PITTSBURGH, PENNSYLVANIA.

APPARATUS FOR DISTILLING CARBONACEOUS MATERIAL.

Application filed February 23, 1923. Serial No. 620,556.

This invention relates to the art of distilling carbonaceous material, such as lignite, shale, peat or bituminous coal. An object of the invention is to effect the distillation of such material at low temperatures, with a rapid transfer of the distilling heat to the material being distilled, and without any necessity for employing the expensive heating surfaces heretofore required because of the slow and inefficient heat transfer of prior low temperature distillation practice. The invention therefore provides an entirely satisfactory low temperature distillation, and yet eliminates expensive retort constructions, with their attendant high cost of maintenance.

In addition to the general objects recited above, the invention has for further objects such other improvements and advantages in operation and results as may be found to obtain in the processes or apparatus hereinafter described or claimed.

In the accompanying drawing forming a part of this specification and showing, for purposes of exemplification, one form of apparatus for carrying out the improved low temperature distillation of the present invention, but without limiting the claimed invention specifically to such illustrative instance:

Figure 1 is a transverse vertical sectional view of a low temperature distillation apparatus constructed in accordance with the invention.

Figure 2 is a longitudinal view of the apparatus, partly in section and partly in elevation.

Figure 3 is a longitudinal sectional view on an enlarged scale.

In its present embodiment, the invention is applied to the low temperature distillation of bituminous coal. For convenience. the ensuing description will be confined to this application of the invention. The novel features and improvements of the invention are, however, applicable to the distillation of other carbonaceous material, for example, to any of the other materials hereinabove mentioned; hence, the scope of the invention is not confined to the specific use and specific embodiment herein described as an illustrative example.

In carrying out the invention, there are employed, as the medium for effecting the transfer of the distilling heat to the material to be distilled, bodies of a substance of high enough heat conductivity to effect a rapid transfer of the distilling heat to the material, for example, bituminous coal. It is preferable, however, to employ metal heat transfer bodies, iron, in any one of its several forms, being especially suitable because of its great specific weight, its high heat conductivity, its good wearing qualities, its resistance to deterioration when subjected to rapid temperature changes and the influence of hot gases, and lastly, because of its cheapness. The invention, however, is not limited to the employment of iron as the material for the heat transfer bodies. In form, the heat transfer bodies may be in the shape of bricks, pebbles, balls, slabs, plates, cubes, or any other form or shape as may be best suitable to meet the exigencies of the commercial practice of the invention.

These heat transfer bodies are exposed to the action of hot gases to store in them the heat which is subsequently employed for effecting the distillation of the material. Any hot gases may be employed, provided that they are not of such a nature as to readily injure the heat transfer bodies. In any case, the temperature to which the heat transfer bodies may be heated is limited by the resistance of the material of which they are composed to oxidize or be otherwise impaired at high temperatures. In case iron is employed, however, the bodies may be heated to a temperature of about 1400° F. in an atmosphere of well burned gases, without unduly exposing the iron to deterioration.

With iron heat transfer bodies, for example, heated to a surface temperature of 1400° F., distillation of the coal may be effected by bringing the coal into direct contact with such hot heat transfer bodies. The coal to be distilled may be either at ordinary atmospheric temperature, prior to the time of contact with the heat transfer bodies, or may be preheated, if desired. At the moment of contact, coal quickly absorbs the peak of the heat stored in the surface of the heat transfer body and in the portions of such body just below its surface. The particles of the coal in contact with the heat transfer bodies are thus rapidly heated, the heat penetrating into the interior of the coal. During the heating up stage, a dry skin of coke is formed on the coal, thereby permitting ready separation of the coal from the heat transfer bodies at the completion of the distillation operation. As the heat transfer from the bodies to the coal progresses, the flow of heat into the coal diminishes in rate, along with the approach of the coal and the heat transfer bodies into an equilibrium of temperature. In order to avoid an impractical slowing up of the heat transfer, after the initial rapid heat absorption by the coal, the weight of the heat transfer bodies employed, with respect to the coal being distilled, is regulated so that the storage capacity for heat of the heat transfer bodies is in excess of the heat required to bring the coal to the required final temperature. The final temperature varies, of course, with different coals, and with the other materials available for treatment by the distillation process of the invention. For many of such materials, however, a satisfactory final temperature is approximately a thousand degrees F. and the process of low temperature distillation would be completed at that temperature. It requires about 400 B. t. u. per pound of material, in order to heat commercial grades of bituminous coal to a final temperature of a thousand degrees F. In order to attain such a final temperature, a maximum temperature drop of the iron heat transfer bodies from 1400° F. to a thousand degrees F. is available. Between 1400° F. and a thousand degrees F., iron, for example, has a specific heat of approximately 0.148. Therefore, $1400-1000 \times 0.148 = 59$ B. t. u. are freed for absorption by the coal, when one pound of iron drops from 1400° F. to a thousand degrees F. Inasmuch as 400 B. t. u. are required for one pound of coal, 400 divided by 59 equals 6.77 pounds of iron which are required to furnish sufficient heat for elevating one pound of coal to a final temperature of approximately 1000° F. In order to compensate for the slowing down of the heat transfer, as above explained, it is preferable to employ approximately twice as much iron as the theoretical minimum, which would be approximately 14 pounds of iron for each pound of coal to be distilled. The far greater weight of iron per unit volume as compared with the same volume of coal makes the relative volumes of the two materials quite capable of being handled practically. For example, bituminous coal weighs approximately 50 pounds per cubic foot. One square foot of coal of one inch thickness would therefore weigh only 4.17 pounds. This coal might be brought into contact with a square foot of hot iron, the latter weighing fourteen times as much as the coal or a total of 58.2 pounds. An iron plate one foot square of the same weight has an approximate thickness of only one and one-half inches.

By preheating the coal or drying it before bringing the coal into contact with the hot iron, the amount of heat required for the distillation process may be materially reduced. This would permit the process to be carried on with a smaller quantity of iron. Even when preheating of the coal is employed, it is preferable to employ enough iron in order that the heat available for distillation be about twice the amount of the theoretical minimum.

According to the present embodiment of the invention, the heat transfer bodies or heating walls are moved through a heating region or zone and then through a coking and distillation zone. In the heating region, coking heat is imparted to said bodies, and, after the proper temperature has been attained, the bodies are progressed to a charging station where the spaces between them are filled with the material to be coked. Thereafter, the bodies are progressed through the coking and distillation zone, in which the coking of the material is effected by the transfer thereto of heat previously stored in said bodies, during their progress through the heating zone. At the completion of the coking stage, the coke is separated from the heat transfer bodies and the latter are again moved into and through the heating zone, for a further heating up and subsequent coking operation.

Referring to the drawings, there is shown a retort structure or furnace 11, constituted of the side walls 12, and the top 13, all constructed preferably of refractory material and arranged to provide an interior chamber or retort 14. The chamber 14 is divided into the heating zone or chamber H and the coking and distillation zone or chamber C. Extending longitudinally through the retort chamber 14 is a horizontal shaft 15 constituting a part of the rotary carrier for the heat transfer bodies. Located at intervals along the peripheral portion of said carrier and extending parallel with the axis of the shaft 15 are the supporting longitudinal beams 16 for the heat transfer bodies. According to the present embodiment of the invention, the heat transfer bodies are constituted of blades or fins 17, made preferably of a metal of high heat conductivity, such as iron, and supported on the bottom members 19 and carrier beams 16 in such manner as to provide on the carrier a series of continuous spaced fins or blades (Fig. 3) with intermediate contiguous narrow annular coking chambers 18. The series of continuous spaced fins or blades thus form over the carrier a series of parallel grooves, or compartments, or receptacles having heating walls forming relatively narrow intermediate coking spaces or carbonizing chambers. The assembly of such heating bodies may be made up of individual blade members secured to the supporting beams 16, or, if desired, several of the blades may be formed integrally with each other and the blade sections secured to the supporting beams. Whatever be the mode of assembly of the heat transfer bodies, it is preferable that they be so constructed and arranged as to provide closed bottoms 19 for the intermediate coking chambers 18.

As shown in the drawings, the blades or fins are secured in place by the screw bolts 44 (Fig. 1) inserted in the bolt holes 45 (Fig. 3) extending through the beams 16 and bottom members 19, said members 19 being plates extending between the beams 16 (Fig. 1) and from side to side of the carrier (Figs. 2 and 3). Each such member 19 supports a group of blades or fins 17 of equal height and thickness (Figs. 2 and 3) to constitute a heating element, the succession of such heating elements or groups arranged around the carrier thus providing a number of continuous parallel bands or annular heating walls spaced laterally from each other to form a series of parallel continuous annular carbonizing chambers. The supporting beams 16 are secured to hubs 20 keyed on the shaft 15, by the radially extending spokes 21. These spokes may, if desired, be yieldably connected to said beams 16 by the links 22 pivoted at their opposite ends to said spokes and supporting beams. This yieldable link construction permits substantially free expansion or contraction of the peripheral portion of the carrier, when exposed to fluctuations of temperature.

As shown in Fig. 1, the rotary carrier with the peripheral heat transfer bodies or blades is disposed so that a portion of the blades is located within the heating chamber, while the remaining portion is in the coking and distilling chamber. The carrier is rotated, preferably continuously, on the horizontal axis 15, and, such rotation is effective to cause the blades on the periphery of the carrier to travel continuously through the heating zone and the coking and distilling zone. The ends of the retort chamber are closed by the removable closure plates 23, the latter surrounding the opposite ends of the carrier shaft 15 and being held in place by the removable bolt and spring connections, designated generally by the reference character 24. As a part of said fastening devices 24, seals 25 are preferably provided for the purpose of preventing the escape of gases from the retort chamber.

By the rotary movement of the carrier, the thin narrow coking chambers 18 disposed intermediate the heat transfer bodies 17 pass to a charging station S located at the top of the retort. The charging station is constituted of a hopper 26 elongated in the direction of the shaft 15 and provided with a co-extending chute 27 through which the coke-forming material deposited in the hopper may be conveyed to and distributed in the coking spaces 18 between the preheated bodies 17. Located just beyond the hopper chute 27, in the direction of movement of the carrier, is a leveler bar 28 which is pivotally suspended from the supporting links 29 so as to seat yieldably on the periphery of the heat transfer bodies and level the charges of coke-forming material in the spaces between them. From the leveler bar 28 the charges of material between the blades 17 pass into the coking and distilling chamber C. During such passage, the charges of material, such as pulverized coal, are coked as a result of the heat transfer between the preheated bodies and the coal. The gases and products of the distillation may pass out of the chamber C through the distillate outlet 30, from which such products may be disposed of as desired. For example, the gaseous products and distillates may be subjected to treatment in by-product recovery apparatus. In order to prevent the coking material from falling out from between the blades 17 as it travels around with the carrier, there is provided a shield or apron 31 conforming in shape to the periphery of the carrier and suitably hung so as to swing toward the carrier, by the suspension links 32 and the lower supporting members 33.

The coking of the material will have been completed when it arrives at the bottom of the chamber C. Here, it is discharged as coke from between the blades 17. In order to insure discharge of the completed coke, a number of poker bars or coke ejectors 34 are arranged in comb-like fashion with their upper ends extending into the spaces between the blades 17 to dig out the coke. These poker bars 34 are secured to a longitudinal bar member 35, which also acts as a seal for separating the distillate chamber C from the heating chamber H, at the point of coke discharge. The supporting bar 35 and with it the poker bars 34 is mounted on a resilient support 36 which acts to thrust the poker bars 34 yieldingly upward into the spaces between the heat transfer plates 17. A counterweighted lever and link mechanism 37 permits the poker bars 34 to be lowered from between the plates 17, whenever desired. The coke discharged from between the plates 17 falls into a hopper 38 which guides the coke to a rotary discharger 39 and coke discharge chute 40.

From the discharging station D, the heat transfer bodies are again carried by the rotation of the carrier into the heating chamber H. Heating gases are introduced into said chamber preferably from both the top inlet 41 and the bottom inlet 42. The gases circulate in contact with the heat transfer bodies and heat them up to the required coking temperature. The exhaust gases from the chamber H may discharge through the outlet 43.

In practice, the gas pressure in the distilling chamber C will be kept slightly below the pressure within the heating chamber H and of the heating gases, so that the distillate will not enter the heating chamber and commingle with the heating gases. Should a small quantity of the heating gases pass over into the distilling chamber, no material harm would result, but the said gases would merely act as a carrier to assist the discharge of the distillate. However, the passage of any material quantity of the heating gases into the distilling chamber C is substantially prevented by the mass of material below the feeding station 27 and, at the discharging station, by the residue material or coke jamming against the poker bars, the material, in both instances, forming seals that separate the heating chamber from the distilling or carbonizing chamber.

The maximum depth to which the poker bars 34 may enter the spaces between the heat transfer plates 17 is determined by the stop 35ᵃ provided at the top of the support 35. This stop 35ᵃ rides on the peripheral edges of said plates 17 and prevents the poker bars from penetrating too deeply and getting jammed.

When shale or other material which does not form coke is treated by the process of the present invention, the residue will be discharged at the discharging station in the same manner as the coke.

The invention as hereinabove set forth may be variously embodied within the scope of the claims hereinafter made.

The invention as herein described or claimed is a continuation in part of my prior application for Letters Patent of the United States for art of distilling carbonaceous materials, filed January 11, 1922, Serial No. 535,790.

I claim:

1. In a coking apparatus, in combination: a retort enclosure divided into chambers respectively constituting a heating chamber and a coking chamber, a carrier rotatably mounted on a horizontal axis within said enclosure for movement through said heating chamber and said coking chamber; a plurality of charge-receiving and coking compartments disposed on the periphery of said carrier and having heating walls forming relatively narrow coking spaces; means for charging said compartments after the heating walls have been raised to a coking temperature in said heating chamber; means for rotating said carrier; and means for discharging the coked material from said compartments after the same have been moved through said coking chamber and prior to their entrance to said heating chamber; substantially as specified.

2. In a coking apparatus, in combination: a retort enclosure divided into chambers respectively constituting a heating chamber and a coking chamber, a carrier mounted for movement through said heating chamber and said coking chamber so as to be at all times disposed partially in said heating chamber and partially in said coking chamber, coking receptacles on said carrier having heating walls forming relatively narrow coking spaces, means for imparting heat to said heating chamber only, means for charging said receptacle with material to be coked, means for moving said carrier successively through said heating chamber to absorb heat and said coking chamber to impart heat absorbed only in the heating chamber, and means for discharging the coked material from said receptacles after their movement through said coking chamber; substantially as specified.

3. In a coking apparatus, in combination: a retort enclosure divided into chambers respectively constituting a heating chamber and a coking chamber; a rotary cylindrical carrier mounted on a horizontal axis for movement through said heating chamber and said coking chamber so as to be at all times disposed partially in said heating chamber and partially in said coking chamber; spaced blades on said carrier providing relatively narrow intermediate coking spaces; means for charging said intermediate spaces with material to be cooked; means for moving said carrier successively through said heating chamber and said coking chamber; and means for discharging the coked material from said intermediate spaces after their movement through said coking chamber, said coke-discharging means comprising spaced poker bars projected between said blades; substantially as specified.

4. In a coking apparatus, in combination: a retort enclosure divided into chambers respectively constituting a heating chamber and a coking chamber; a rotary cylindrical carrier mounted on a horizontal axis for movement through said heating chamber and said coking chamber so as to be at all times disposed partially in said heating chamber and partially in said coking chamber; spaced blades on said carrier providing relatively narrow intermediate coking spaces; means for charging said intermediate spaces with material to be coked; means for moving said carrier successively through said heating chamber to absorb heat and said coking chamber to impart heat absorbed only in the heating chamber; and means for discharging the coked material from said intermediate spaces after their movement through said coking chamber; substantially as specified.

5. A distilling apparatus comprising, in combination: a carrier rotatable on a horizontal axis and provided with circumferential grooves, means for heating the walls of said grooves, means for feeding by gravity the material to be distilled into said grooves, and ejectors entering the grooves for removing the residue after the distillation; substantially as specified.

6. A distilling apparatus comprising, in combination: a carrier rotatable on a horizontal axis and provided with circumferential grooves, means for heating the walls of said grooves, means for feeding the material to be distilled into said grooves, and ejectors entering the grooves for removing the residue after the distillation; substantially as specified.

7. A distilling apparatus comprising, in combination: a rotatable carrier having spaced ribs providing grooves to receive the material to be distilled, means for feeding such material into said grooves, means for leveling the material, an apron for preventing the material from falling out of the grooves during the distillation, and ejectors entering the grooves for removing the residue after the distillation; substantially as specified.

8. A distilling apparatus comprising, in combination: a rotatable carrier having spaced ribs providing grooves for receiving the material to be distilled, means for heating said ribs, means for feeding such material into said grooves, yieldably supported ejectors entering the grooves for removing the residue after the distillation, and means for limiting the depth of penetration of said ejector into said grooves; substantially as specified.

9. In apparatus for distillation of solid carbonaceous material, particularly for low temperature carbonization, in combination: a distillation chamber; a plurality of solid heat transfer bodies; means for heating said solid bodies outside of said distillation chamber to the requisite temperature to impart coking heat to a charge in the distillation chamber; means for introducing into the distillation chamber such previously heated solid bodies in such volume as to effect the distillation; and means for separating said solid bodies and the carbonaceous matter distilled.

10. In a coking apparatus, in combination: a distillation chamber; a heating chamber; means for heating said heating chamber; a chain of bottom members adapted to pass through said distillation chamber and through said heating chamber and having vertically extending parallel heat storing ribs extending outwardly therefrom; means adapted to move said chain of bottom members and their ribs through said distillation chamber, there to impart stored coking heat to material to be carbonized in contact with said members and ribs, and to move them through said heating chamber to store coking heat; and means adjacent the entrance of said bottom members into said distilling chamber for delivering material to be distilled to said bottom members between said ribs.

11. Apparatus as claimed in claim 10 and in which the chain of bottom members having vertically extending parallel heat storing ribs is constituted of a plurality of heating elements, each element consisting of a group of parallel ribs supported on a base member, each element being connected with the means for moving the chain through the chambers.

12. Apparatus as claimed in claim 10 and in which the vertically extending parallel ribs are disposed in groups of equally spaced ribs of equal height and thickness relative to each other, said groups being arranged in succession so as to provide a number of continuous parallel bands.

13. Apparatus as claimed in claim 10 and in which the bottom members close the spaces between the ribs and are interposed between the ribs and the means for moving the chain through the distillation chamber and the heating chamber, whereby the base members prevent coal and heating medium from coming in contact with the means for moving the chain through said members.

14. In a coke oven, in combination: a heating chamber; means for heating said heating chamber; a coking chamber; series of thick heat transfer bodies of high heat capacity and conductivity arranged side by side and spaced from each other to provide intermediate narrow coking spaces; said series of heat transfer bodies being mounted for movement in circuit through said heating chamber and said coking chamber, a portion of said series of heat transfer bodies being movably disposed within said heating chamber and another portion of said series of heat transfer bodies movably disposed in said coking chamber; and means adapted to move said series of heat transfer bodies in circuit through said chambers; whereby said heat transfer bodies may store coking heat while in said heating chamber and impart such stored heat while in said coking chamber.

15. Apparatus as claimed in claim 14 and in which the side by side heat transfer bodies are of equal height and thickness relative to each other and are equally spaced from each other.

16. Apparatus as claimed in claim 14 and in which the side by side heat transfer bodies are arranged to provide a plurality of parallel spaced bands connected together to travel together and in parallel and in vertical planes through the heating chamber and through the distillation chamber.

17. A low temperature carbonizing apparatus comprising, in combination: a heating chamber; a carbonizing chamber; a plurality of thick heat transfer plates of high heat capacity and conductivity set up in vertical parallel planes; means adapted to carry said plates in said planes successively through said heating chamber to heat them up to above carbonizing temperature and through said carbonizing chamber to carbonize by such heat.

18. In a distilling apparatus, in combination; a structural unit having spaced ribs providing grooves to receive material to be distilled; and a second structural unit comprising means for feeding said material into said grooves and for leveling it, an apron for preventing the material from falling out of the grooves during the distillation and ejectors entering the grooves for removing the residue after the distillation; one of said structural units being rotatable relatively to the other.

19. In a carbonizing retort, in combination: a rotatably mounted series of continuous annular heating walls located laterally of each other and spaced from each other so as to provide a series of continuous annular carbonizing chambers adapted to be rotated; heating means for heating said heating walls; hopper means for continuously supplying material to be carbonized to each of said carbonizing chambers simultaneously; means extending into each of said carbonizing chambers for continuously removing carbonized material from each of said chambers simultaneously; a casing surrounding said series of continuous annular heating walls and carbonizing chambers and adapted to collect gases developed from material being carbonized within said carbonizing chambers; said rotatably mounted series of continuous annular heating walls and carbonizing chambers forming a structural unit and said means for continuously supplying, said means for continuously removing and said casing, forming a second structural unit; and means for rotating said series of continuous annular heating walls and carbonizing chambers relatively to the second structural unit.

20. In a carbonizing retort, in combination: a series of continuous annular heating walls located laterally of each other and spaced from each other so as to provide a series of continuous annular carbonizing chambers; heating means for heating said walls; hopper means for continuously supplying material to be carbonized to each of said carbonizing chambers simultaneously; means extending into each of said carbonizing chambers for continuously removing carbonized material from each of said chambers simultaneously; a casing surrounding said series of heating walls and carbonizing chambers and adapted to collect gases developed from material being carbonized within said carbonizing chambers; said series of continuous annular heating walls and carbonizing chambers forming a structural unit and said means for continuously supplying, said means for continuously removing and said casing, forming a second structural unit; and means for rotating one of the structural units relatively to the other.

21. In a carbonizing retort, in combination: a rotatably mounted series of continuous annular heating walls located laterally of each other and spaced from each other so as to provide a series of continuous annular carbonizing chambers adapted to be rotated; heating means for heating said heating walls; hopper means for continuously supplying material to be carbonized to each of said carbonizing chambers simultaneously; means extending into each of said carbonizing chambers for continuously removing carbonized material from each of said chambers simultaneously; a casing surrounding said series of continuous annular heating walls and carbonizing chambers and adapted to collect gases developed from material being carbonized within said carbonizing chambers; and leveler means extending within said casing in position for pressing within each of the said carbonizing chambers carbonizable material newly supplied therein; said rotatably mounted series of continuous annular heating walls and carbonizing chambers forming a structural unit and said means for continuously supplying, said means for continuously removing, said casing and said leveler means, forming a second structural unit; and means for rotating said series of continuous annular heating walls and carbonizing chambers relatively to the second structural unit.

22. In a carbonizing retort, in combination: a series of continuous annular heating walls located laterally of each other and spaced from each other so as to provide a series of continuous annular carbonizing chambers; heating means for heating said heating walls; hopper means for continuously supplying material to be carbonized to each of said carbonizing chambers simultaneously; means extending into each of said carbonizing chambers for continuously removing carbonized material from each of said chambers simultaneously; a casing surrounding said series of heating walls and carbonizing chambers and adapted to collect gases developed from material being carbonized within said carbonizing chambers; and leveler means extending within said casing in position for pressing within each of the said carbonizing chambers carbonizable material newly supplied therein; said series of continuous annular heating walls and carbonizing chambers forming a structural unit and said means for continuously supplying, said means for continuously removing, said casing and said leveler means, forming a second structural unit; and means for rotating one of the structural units relatively to the other.

In testimony whereof I have hereunto set my hand.

FRANZ PUENING.